March 2, 1926.
M. W. KELLOGG
1,574,900
APPARATUS AND METHOD FOR MAKING OPENINGS IN PIPES, CYLINDRICAL TANKS, ETC
Filed July 16, 1923     2 Sheets-Sheet 1
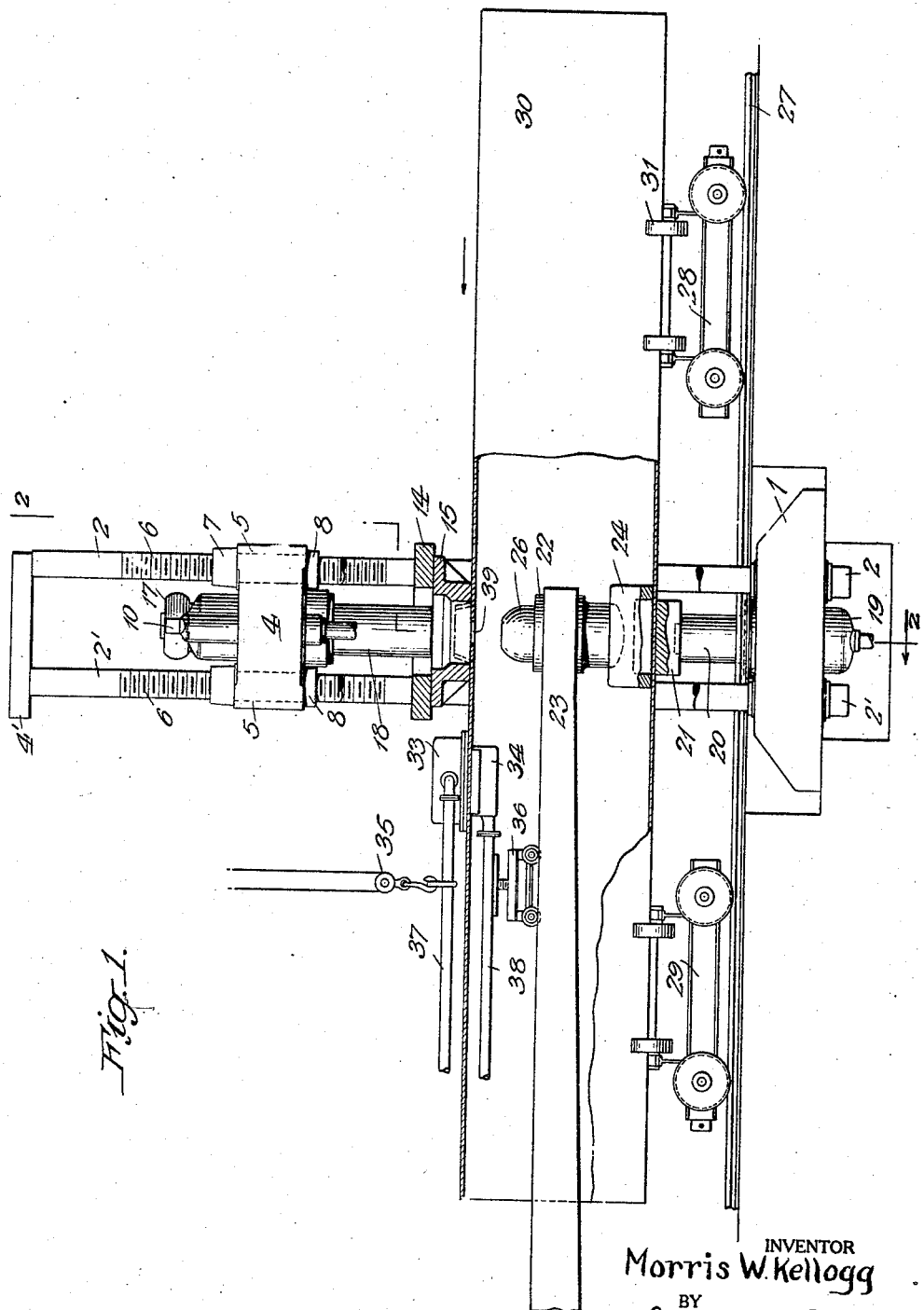
INVENTOR
Morris W. Kellogg
BY
Sheffield & Betts
HIS ATTORNEYS

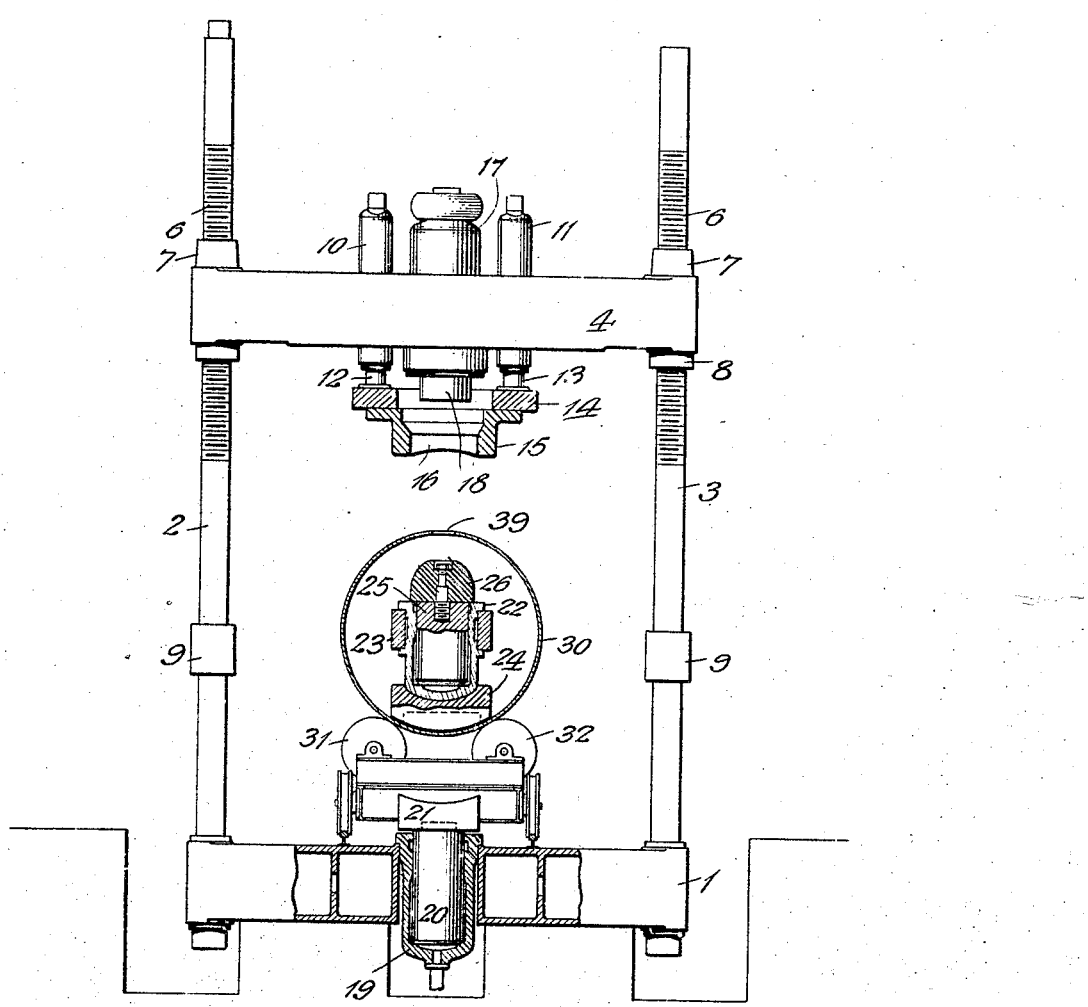

Patented Mar. 2, 1926.

1,574,900

UNITED STATES PATENT OFFICE.

MORRIS W. KELLOGG, OF BROOKVILLE, NEW YORK, ASSIGNOR TO THE M. W. KELLOGG COMPANY, A CORPORATION OF DELAWARE.

APPARATUS AND METHOD FOR MAKING OPENINGS IN PIPES, CYLINDRICAL TANKS, ETC.

Application filed July 16, 1923. Serial No. 651,957.

*To all whom it may concern:*

Be it known that I, MORRIS W. KELLOGG, a citizen of the United States, residing at Brookville, county of Nassau, State of New York, have invented certain new and useful Improvements in Apparatus and Methods for Making Openings in Pipes, Cylindrical Tanks, Etc., of which the following is a full, clear, concise, and exact description.

This invention relates particularly to apparatus for making flue-openings in pipes, and also to the method of making such openings whereby they may be made in the sides of pipes, cylinders, and the like, of any desired size or shape, so as to form a flange on the margin of the opening which flange is drawn from the metal adjacent the opening. The invention is particularly adapted for use in connection with tubes of large diameter, such as flue openings for connection with the smoke pipe of boilers, although its use in other connections is obvious.

By "flue-opening", I desire to be understood as meaning an opening in the side of a pipe having a flange extending outwardly adjacent the periphery of the opening. While my invention may also be employed for making such openings in curved surfaces other than in the sides of pipes such as cylinders, for instance, I shall refer herein, for simplicity, to all of such openings as flue-openings. Heretofore, while flanged openings have been formed in heads or slightly convex metal surfaces, or plates, it has not been considered possible to make them in the sides of pipes or cylinders. The general practice in making openings or outlets in the side of pipes or cylinders has been to cut a hole of the desired size and shape in the pipe and then rivet, weld or otherwise secure a flanged collar around the opening, requiring considerable labor and time, and special collars for different sized holes.

It is the object of the present invention to provide an improved apparatus and method by which the additional collar, and the loss of labor, time and attendant difficulties incident thereto may be eliminated, and by which a more satisfactory flue-opening and flange may be provided without the use of additional material, in less time and with little work. According to my invention flue-openings may be provided of any size or shape by simply changing certain parts, that is, the die and forming punch, sets of which may be provided for the various sizes of flue-openings.

My invention will be better understood from the following description taken in connection with the accompanying drawings and its scope will be pointed out in the appended claims.

In the drawings, illustrating what I now consider the preferred form of my invention, Fig. 1 is a side view, with parts illustrated in section, of apparatus embodying my invention, shown in operative position, and Fig. 2 is a vertical section taken substantially on the line 2—2 of Fig. 1.

Referring to the drawings in which the numeral 1 indicates a base, which supports at each end a pair of upright members 2, 2' and 3, 3', which may be united at their upper ends by a yoke 4', shown in Fig. 1, thus forming the frame for one of the units of my invention. A cross piece 4, positioned intermediate the base 1 and yoke 4', is provided with four openings 5, two of which are indicated by dotted lines in Fig. 1, said openings being suitably positioned so that the upright members 2, 2', and 3, 3' will project therethrough. As shown in the drawings, said upright members are each provided with similar screw-threads 6. Each of the said upright members are also provided with a nut 7, in threaded engagement with the respective threaded portion 6, located on the upper side of the cross-piece 4, and with a similar nut 8 located below the cross-piece 4. By this arrangement, the cross-piece 4 may be adjusted to any desired position by simply rotating the nuts 7 and 8 of the several upright members in a well known manner. It is, of course, understood that the several openings 5 are large enough to be free of threads 6. Said upright members, 2, 2' and 3, 3' may each be provided with similar collars 9, suitably positioned to limit the downward movement of the cross-piece 4.

The cross-piece 4 carries two hydraulic cylinders 10, 11, which may be of any standard type, preferably located at points equidistant from the middle of the cross-piece. As shown in Fig. 2, the cylinders 10, 11 extend through the cross-piece, their respective pistons 12, 13, being located on the lower side thereof. A ring 14 is suitably secured to the pistons 12, 13, which ring carries a die 15, fixed thereto in any suitable manner. The die 15 may be of any desired shape, such as round, oval, and the like, and has a central opening 16. It may be secured to the ring in any convenient manner to permit its replacement with a different die, if desired. Positioned intermediate the cylinders 10, 11, is a third cylinder 17, similar to cylinders 10, 11, but preferably somewhat larger, having a piston 18, arranged to reciprocate within the central openings of the ring 14 and die 15, for a purpose hereinafter described.

The base 1 is provided with a hydraulic cylinder 19, having a piston 20, which carries a thrust-block 21. As shown in the drawings, the piston 20 is arranged to move inwardly with respect to the frame, or towards the die 15 and is preferably located with its center line coincident with the center line of the cylinder 17. The upper surface of the thrust-block 21 is concave, to conform to the outside surface of the particular tube or pipe on which work is being done, and may be readily removed.

Intermediate the cylinder 19 and the die 15 is a fifth hydraulic cylinder 22, which may be similar to the other cylinders mentioned, carried by an arm 23, pivoted at some point to the left in Fig. 1, not illustrated, in order that the cylinder 22 may be reciprocated in a vertical plane. The lower end of the cylinder 22 is preferably curved, to fit into the curved depression of a thrust block 24. The piston 25 of cylinder 22 carries a forming punch 26, arranged to cooperate with die 15, as will appear hereinafter. As shown in Fig. 2, the punch 26 is screwed to the piston 25, and may be readily replaced by a different punch.

When the piston 20 holds the thrust block 21 against the pipe 30, said piston will prevent distortion of the pipe by the reaction of the hydraulic cylinder 22 upon the interior of the pipe, the thrust blocks 21 and 24 having curved surfaces to correspond with the curvature of the pipe. This arrangement permits heavy pressures to be transmitted to the forming punch 26 without injury to other parts of the material being treated.

While I have referred to the several cylinders as hydraulic, it is to be understood that any suitable type of cylinder may be employed which may be operated by any fluid pressure medium. Nor have I shown connections with said cylinders, as this is well understood in the art. In the case of cylinder 22, however, the pressure medium may be supplied by means of tubes carried by the arm 23, or by suitable passages within the arm itself, not illustrated.

I have also provided a track 27, running between the upright elements 2, 2' and 3, 3', for trucks 28, 29, employed for carrying the pipe 30 on which work is to be done into and out of the apparatus described. These trucks are preferably provided with two pairs of rollers 31, 32, pivoted at right angles to the axles of the trucks, a pair of said rollers being located on each side of the center line of the truck, as shown in Fig. 2. These rollers are provided in order that the pipe 30 may be readily rotated about its axis to properly position the same.

When necessary the apparatus also includes a suitable heating device, which is shown as an oil or gas heater of two units 33 and 34. The unit 33 is provided for heating the outer surface of the pipe 30, and may be moved to various positions by means of a pulley 35, and any suitable crane or other mechanism, not illustrated. The unit 34 is provided for heating the inner surface of the pipe 30, and may be carried on a small truck 36, arranged to run in a track formed on the arm 23.

The feed pipes 37, 38 of units 33, 34 respectively, may be extended a suitable distance and united, or the units 33, 34 may be provided with other extensions and connected, so that both units 33 and 34 may be moved simultaneously.

In view of the foregoing detailed description of my apparatus, the method and operation thereof will be readily understood. A hole 39 is cut in the pipe 30 at the point where the flue-opening is to be made. Its size and shape depends upon the size and shape of the flue-opening desired. The pipe 30 is placed upon the trucks 28, 29, and moved towards the flue-opening apparatus described, in the direction of the arrow in Fig. 1. The arm 23, and the elements carried thereby passes within the pipe 30, and the block 21 and die 15 are outside of the pipe. The pipe 30 is moved forward, and rotated on the rollers 31, 32, until the hole 39 is below the center of die 15. The pistons 12 and 13 are actuated to lower the die 15 so it will make light contact with the pipe to determine whether it is properly positioned. For the same purpose, the punch 26 is similarly actuated, the same being viewed through the hole 39. For convenience, the center of the punch may be provided with a suitable mark. If the pipe 30 is now found to be properly positioned, the thrust block 24 is inserted beneath the cylinder 22 and cylinder 19 is operated to move the thrust-block 21 into engagement with the outer surface of the pipe 30, the several parts assuming the position indicated in Fig. 1.

The die 15 is now raised from its contact position, and the heating units 33 and 34 are moved to the right to heat that portion of the pipe 30 adjacent the hole 39. After the proper heat has been attained, the heating units are withdrawn, the die 15 is brought into contact with the pipe by means of pistons 12, 13, and punch 26 is actuated by piston 25, and forced up through hole 39, flaring the sides of the flue-opening in a manner readily understood. If for any reason the forming punch should stick, it may be pushed downwardly by the piston 18.

Having thus described this form of my invention, I do not wish to be understood as being limited to the details and arrangements of the parts set forth, for various changes may be made by those skilled in the art without departing from the spirit and scope of my invention.

What I claim is:

1. Apparatus for making flanged openings in the side of an elongated hollow body, comprising in combination, a die, a fluid operated forming punch adapted to be inserted within said body and to be expanded within said body to cause the forming part thereof to enter said die, and means to prevent distortion of said body by the reaction of said punch.

2. Apparatus for making flanged openings in the side of an elongated body, comprising in combination, a die, a fluid operated forming punch adapted to be inserted within said body and to be expanded within said body to cause the forming part thereof to enter said die, means for withdrawing said punch from the die, and means to prevent distortion of said body by the reaction of said punch.

3. Apparatus for making a flanged opening in the side of a hollow body, comprising in combination, a die concentric with said opening and movable with respect thereto and adapted to be placed in contact with the outer surface of said body, a forming punch adapted to be inserted longitudinally within said body and freely movable therein and be positioned on the inner surface thereof opposite said die, and thrust bearing means for said punch located within the pipe and resting upon the inner surface of a portion thereof opposite said die, and a thrust bearing located outside of the pipe adjacent said portion.

4. Apparatus for making a flanged opening in the side of a hollow body, comprising in combination, a die concentric with said opening and movable with respect thereto and adapted to be placed in contact with the outer surface of said body, a forming punch adapted to be inserted longitudinally within said body and freely movable therein and be positioned on the inner surface thereof opposite said die, and bearing means located within the pipe resting upon the inner surface of a portion thereof, a thrust bearing located outside of the pipe adjacent said portion, and pressure means for moving said latter thrust bearing and maintaining it in contact with the outer surface of said pipe.

5. Apparatus for making openings in the side of a hollow body comprising in combination a pressure actuated die arranged to make contact with the outer surface of a pipe, a pressure actuated forming punch arranged to cooperate with said die and to be located within the pipe, a bearing for said punch positioned within the pipe and a pressure actuated thrust bearing positioned outside of the pipe to counteract the downward thrust of said punch when operated.

6. Apparatus as specified in claim 1 in combination with means for heating the portion of a pipe intermediate said die and punch.

7. Apparatus as specified in claim 1 in combination with means adapted to pass through said die for restoring said punch to its normal position after operation.

8. Apparatus as specified in claim 1 in combination with an hydraulic plunger adapted to pass through said die for restoring said punch to its normal position after operation.

9. Apparatus for making openings in the side of a hollow body comprising in combination means for heating a portion of a pipe adjacent an opening in the side thereof, a die positioned concentric with said pipe opening having a central opening, pressure actuated means for moving said die and maintaining it in contact with the outer surface of said pipe, a forming punch arranged to cooperate with said die located within the pipe, pressure actuated means for operating said punch, thrust bearing means adjacent the inner and outer surfaces of the pipe to counteract the downward thrust of said punch when operated, and pressure actuated means located outside of the pipe and acting through the die central opening for restoring said punch to its normal position after operation.

10. Apparatus for making openings in the side of a hollow body comprising in combination a frame, a die adjustably supported thereby, means for moving a pipe having an opening cut in the side thereof within said frame, means for positioning said pipe with its side opening concentric with said die, a forming punch arranged to cooperate with said die supported within said pipe, and means for heating the portion of the pipe adjacent its side opening.

11. Apparatus for making openings in the side of a hollow body comprising in combination means for heating a portion of a pipe adjacent an opening in the side thereof, a die positioned concentric with said pipe opening having a central opening, pressure actuated means for moving said die and maintaining it in contact with the outer surface of said pipe, a forming punch arranged to cooperate with said die located within the pipe, pressure actuated means for operating said punch, bearing means for said punch positioned within the pipe, and bearing means positioned outside of the pipe to counteract the downward thrust of said punch when operated and pressure actuated means located outside the pipe and acting through the die central opening for restoring said punch to its normal position after operation.

12. Apparatus for flanging holes in the side of a hollow body comprising in combination a frame, a die adjustably supported thereby, means for moving a pipe having an opening cut in the side thereof within said frame, means for positioning said pipe with its side opening concentric with said die, a forming punch arranged to cooperate with said die, an element extending into said pipe for supporting said punch and means for heating the portion of the pipe adjacent its side opening comprising a heating unit within the pipe, a truck for supporting the same arranged to run on said element, a heating unit adjacent the outer surface of the pipe, and means for moving both heating units to and from said side opening.

13. Apparatus for flanging holes in the side of a hollow body comprising in combination a frame, a die adjustably supported thereby, a track passing within said frame, a plurality of trucks therefor having rollers positioned at each side of their longitudinal axes and at right angles to their axles, whereby a pipe having an opening cut in the side thereof may be conveyed and positioned with its side opening concentric with said die, a forming punch arranged to cooperate with said die supported within said pipe, and means for heating the portion of the pipe adjacent its side opening.

14. Apparatus for making flanged openings in a hollow body, comprising in combination, a fluid actuated die, a fluid actuated punch, fluid actuated means for withdrawing said punch from said die, a thrust block positioned upon a portion of the inner surface of said body, means whereby pressure may be transmitted to the said thrust block, a thrust block positioned on the outer surface of said body adjacent said portion, and means whereby pressure may be transmitted to the last-mentioned thrust block.

15. The method of flanging a hole in the side of a hollow body which comprises cutting an opening in the side of said body, locally heating the portion of said body to be flanged about said opening, removing said heating means, inserting a suitable punch longitudinally within said body to a point opposite said opening and then expanding said punch to force out the margin of said opening by pressure reacting on the opposite wall of said body while maintaining said wall in a fixed position and then contracting said punch by pressure inserted through said opening.

MORRIS W. KELLOGG.